Figure 1:
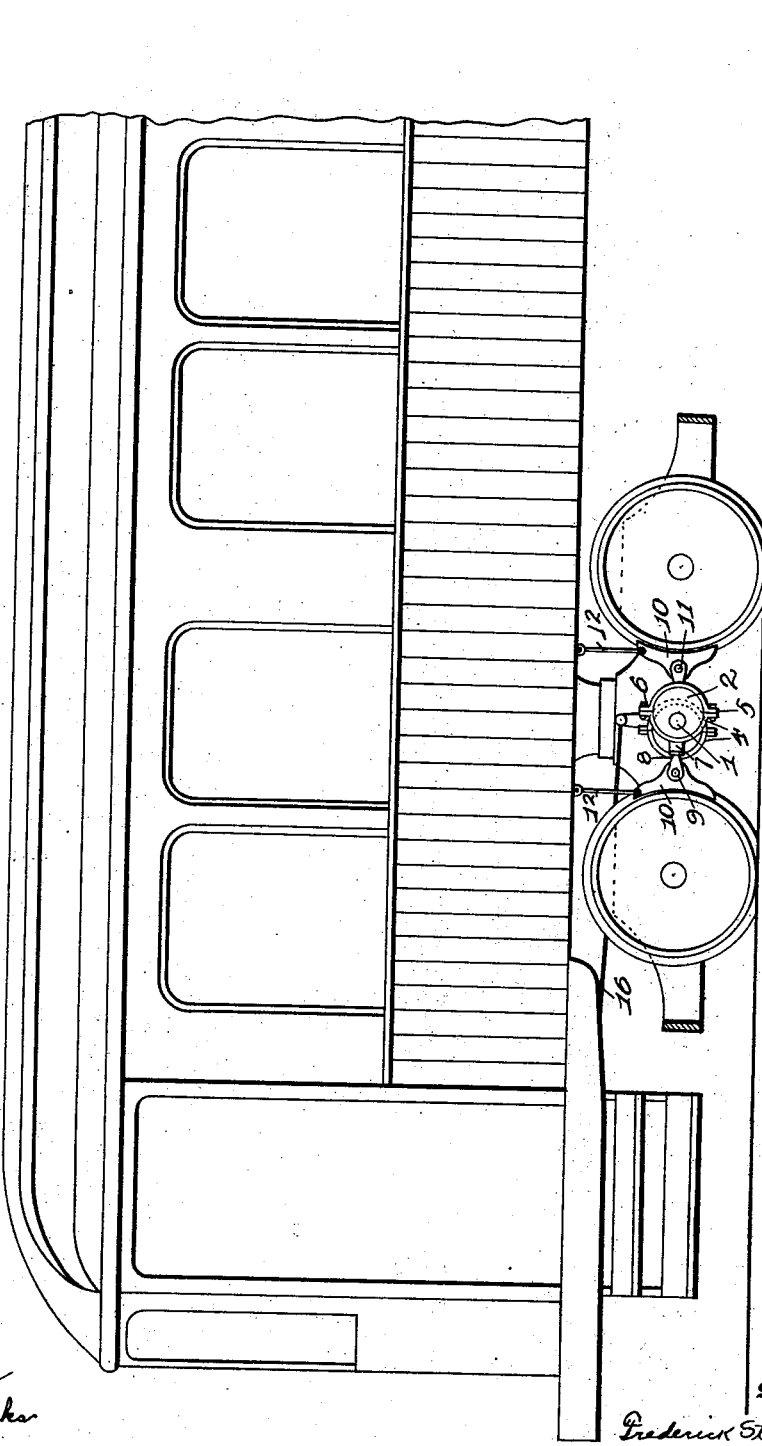

No. 756,188. PATENTED MAR. 29, 1904.
F. STOLTZENBURG.
BRAKE.
APPLICATION FILED OCT. 12, 1903.
NO MODEL. 2 SHEETS—SHEET 1.

No. 756,188. PATENTED MAR. 29, 1904.
F. STOLTZENBURG.
BRAKE.
APPLICATION FILED OCT. 12, 1903.
NO MODEL. 2 SHEETS—SHEET 2.
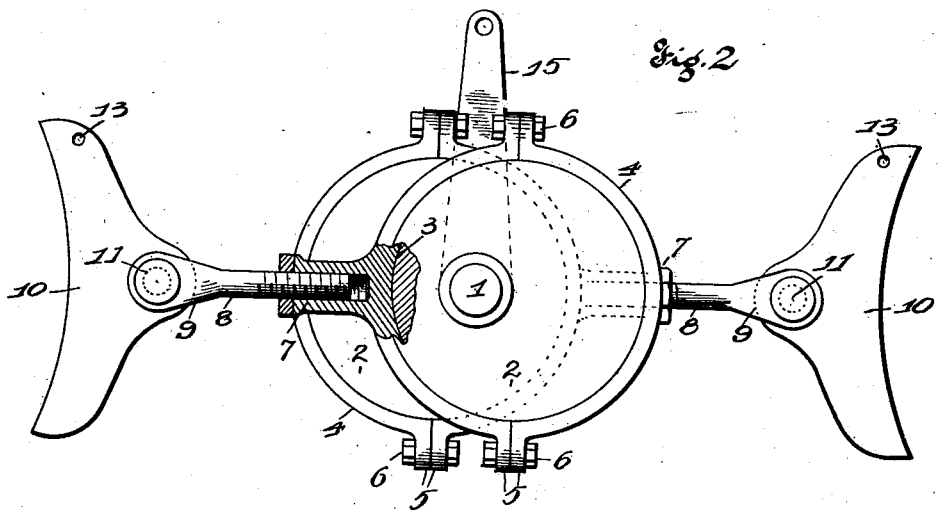
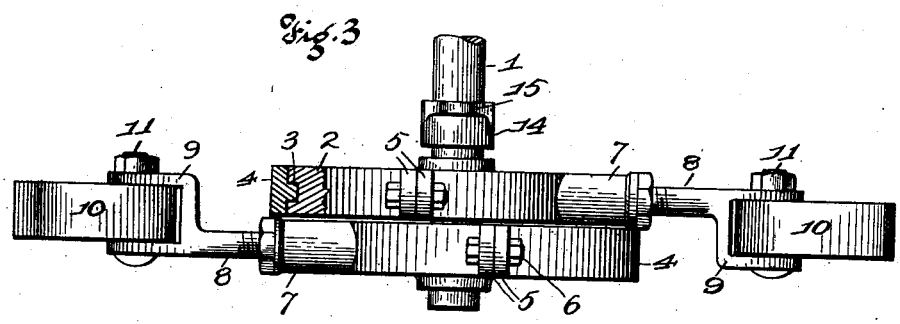

No. 756,188.

Patented March 29, 1904.

UNITED STATES PATENT OFFICE.

FREDERICK STOLTZENBURG, OF ST. LOUIS, MISSOURI, ASSIGNOR OF ONE-FOURTH TO CONRAD MEYER, OF ST. LOUIS, MISSOURI.

BRAKE.

SPECIFICATION forming part of Letters Patent No. 756,188, dated March 29, 1904.

Application filed October 12, 1903. Serial No. 176,638. (No model.)

*To all whom it may concern:*

Be it known that I, FREDERICK STOLTZENBURG, a citizen of the United States, residing at St. Louis, State of Missouri, have invented certain new and useful Improvements in Brakes, of which the following is a specification, containing a full, clear, and exact description, reference being had to the accompanying drawings, forming a part hereof.

My invention relates to improvements in brakes, and has for its object to provide a brake capable of use in any location in which a brake is desired and which is readily and effectually actuated at a minimum expense of power.

In the drawings, Figure 1 is a side view of a car having a two-wheel truck, to each of which wheels the brake of my invention is applied. Fig. 2 is an enlarged side view of the brake of my invention, showing a portion of the disk, ring, and socket broken away. Fig. 3 is a top view of the same, showing a portion of the ring and disk in section.

As shown in the drawings, I have provided the shaft 1, upon which the disks 2 are fixed, the disks being provided about their edges with the groove 3, into which the ring 4 is adapted to fit closely, the ring 4 being made in two sections provided with outwardly-projecting lugs 5, which lugs are joined together by means of bolts 6. The rings 4 are provided with outwardly and radially projecting threaded sockets 7. The rods 8 are threaded to screw into the sockets 7 and are provided at their outer extremities with the yokes 9, within which the brake-shoes 10 are mounted, preferably by means of bolts 11.

In order to keep the brake-shoes 10 in alinement when power is not being applied to the brake, I have provided hangers 12, the lower ends of which enter openings 13 at the tops of the brake-shoes and the upper ends of which are fastened to the truck or other suitable portion of the vehicle to which the brake is applied.

I have sought in my invention to provide for the wear occasioned by friction upon the faces of the brake-shoes when in use. To this end the parts heretofore described are to be manipulated as follows: The brake-shoe 10 will be released from the yoke 9 by means of the removal of the bolt 11, and the rod 8 will be unscrewed from the socket 7 to an extent equal to the wear of the brake-shoe, when the brake-shoe 10 will again be replaced within the yoke 9 and fastened in place by means of the bolt 11. It is obvious that in case of accidental injury or excessive wear the brake-shoe 10 may be removed and replaced with other brake-shoes at will.

In the form shown in the drawings I have exhibited a double brake, the shaft being provided with two disks, which are mounted eccentrically and oppositely thereon, so that by the revolution of the shaft 1 the alined brake-shoes 10 will be thrust outwardly in opposite directions, so as to operate upon the adjacent alined wheels of a car, as shown in Fig. 1. It is obvious that any number of the disks 2 and their connections may be mounted upon the same shaft, as desired, so that four or more brake-shoes may be mounted upon and actuated by one shaft.

In the drawings I have shown a collar 14, provided with a projecting arm 15, to which a rod 16 is pivotally connected; but it is obvious that the shaft 1 may be driven by means of a crank, gear-wheel, or any other desired means.

In addition to its economy of power the brake of my invention is economical in use by reason of the small number of parts employed and the readiness with which any one of said parts can be removed and replaced in case of accidental injury or wear.

Having thus described my invention, what I claim as new, and desire to have secured to me by the grant of Letters Patent, is—

The improved brake, comprising the combination with two alined wheels, of a shaft mounted between said wheels, two eccentrics oppositely mounted on said shaft, oppositely-directed rods having one end connected to said eccentrics, brake-shoes alined with each other and with said alined wheels and attached to the outer ends of said eccentric-rods, and means for rocking said shaft, to simultaneously force apart said brake-shoes and apply them to the opposite alined treads of the wheels.

In testimony whereof I have signed my name to this specification in presence of two subscribing witnesses.

FREDERICK STOLTZENBURG.

Witnesses:
M. G. IRION,
ALFRED A. EICKS.